(12) United States Patent
Randall (10) Patent No.: US 12,391,085 B2
(45) Date of Patent: Aug. 19, 2025

(54) MOTORIZED ADJUSTMENT OF A DAMPER BLEED

(71) Applicant: Fox Factory, Inc., Duluth, GA (US)

(72) Inventor: Connor Randall, Salida, CO (US)

(73) Assignee: Fox Factory, Inc., Duluth, GA (US)

( * ) Notice: Subject to any disclaimer, the term of this patent is extended or adjusted under 35 U.S.C. 154(b) by 0 days.

(21) Appl. No.: 18/533,949

(22) Filed: Dec. 8, 2023

(65) Prior Publication Data

US 2024/0308288 A1    Sep. 19, 2024

Related U.S. Application Data

(60) Provisional application No. 63/431,618, filed on Dec. 9, 2022.

(51) Int. Cl.
*B60G 17/015* (2006.01)
*F16F 9/46* (2006.01)

(52) U.S. Cl.
CPC ...... *B60G 17/0152* (2013.01); *B60G 2202/24* (2013.01); *B60G 2202/312* (2013.01); *B60G 2202/42* (2013.01)

(58) Field of Classification Search
CPC ............ B60G 17/0152; B60G 2202/24; B60G 2202/31; B60G 2202/312; B60G 2202/42; B60G 2202/442
USPC .................................................... 280/124.16
See application file for complete search history.

(56) References Cited

U.S. PATENT DOCUMENTS

| | | | |
|---|---|---|---|
| 5,129,488 A * | 7/1992 | Furuya | F16F 9/5126 188/317 |
| 5,383,679 A * | 1/1995 | Nakamura | B60G 15/067 318/400.41 |
| 7,374,028 B2 | 5/2008 | Fox | |
| 7,484,603 B2 | 2/2009 | Fox | |
| 8,616,351 B2 * | 12/2013 | Roessle | F16F 15/023 188/266.5 |
| 8,838,335 B2 | 9/2014 | Bass et al. | |
| 8,857,580 B2 | 10/2014 | Marking | |
| 8,955,653 B2 | 2/2015 | Marking | |
| 8,991,832 B2 * | 3/2015 | Tetzlaff | B60G 17/04 280/6.151 |

(Continued)

FOREIGN PATENT DOCUMENTS

| | | | | |
|---|---|---|---|---|
| CN | 111196116 A * | 5/2020 | | B60G 13/08 |
| CN | 111853133 B * | 9/2021 | | B60G 13/08 |

(Continued)

OTHER PUBLICATIONS

Description Translation for CN 111853133 from Espacenet (Year: 2021).*

*Primary Examiner* — Jason D Shanske
*Assistant Examiner* — Daniel M. Keck (57) ABSTRACT

A powered bleed adjuster is disclosed. The powered bleed adjust includes a barrel valve located at least partially within a bleed fluid pathway of a shaft. The barrel valve includes an internal fluid path formed along a longitudinal axis of the barrel valve, an opening of the internal fluid path at a first end of the barrel valve, and at least one bleed port through a wall of the barrel valve to provide a second opening for the internal fluid path. The powered bleed adjust also includes a motor coupled with the barrel valve, the motor configured to rotate the barrel valve to control a fluid flow through the bleed fluid pathway.

16 Claims, 7 Drawing Sheets

(56) References Cited

U.S. PATENT DOCUMENTS

| | | |
|---|---|---|
| 9,303,712 B2 | 4/2016 | Cox |
| 10,060,499 B2 | 8/2018 | Ericksen et al. |
| 10,433,671 B2 | 10/2019 | Surface |
| 10,737,546 B2 | 8/2020 | Tong |
| 10,933,710 B2 | 3/2021 | Tong |
| 2021/0339594 A1 * | 11/2021 | Wang ................ B60G 17/0152 |

FOREIGN PATENT DOCUMENTS

| | | | | |
|---|---|---|---|---|
| EP | 3290738 A1 * | 3/2018 | ............ | B60G 13/06 |
| WO | WO-2018061726 A1 * | 4/2018 | ................ | F16F 9/19 |

* cited by examiner

MOTORIZED ADJUSTMENT OF A DAMPER BLEED

CROSS-REFERENCE TO RELATED APPLICATIONS (PROVISIONAL

This application claims priority to and benefit of U.S. Provisional Patent Application No. 63/431,618 filed on Dec. 9, 2022, entitled "DC Motor Bleed Adjust" by Connor Randall and assigned to the assignee of the present application, the disclosure of which is hereby incorporated by reference in its entirety.

FIELD OF THE INVENTION

Embodiments of the invention generally relate to methods and apparatus for use in a vehicle suspension.

BACKGROUND OF THE INVENTION

Shock assemblies are used in numerous different systems to absorb some or all of a movement that is received at a first portion of the system before it is transmitted to a second portion of the system. Tunable shock assemblies can include a manual bleed adjuster which is often located on or about the eyelet of the shock assembly and is used to modify the rebound and/or compression characteristics of the shock assembly.

In general, a bleed is a fluid pathway that traverses the main piston without using the main piston valving. A bleed valve is used to control the amount of bleed (or working fluid flow) that utilizes the bleed to traverse the main piston. The manual bleed adjuster is coupled with the bleed valve such that a user input to the adjuster will cause the bleed valve to change the working fluid flow rate through the bleed which will modify the damping performance/characteristics of the shock assembly. By providing an external manual bleed adjuster, these adjustments can be made without requiring disassembly of the shock assembly.

In some electronic shock assemblies, a stepper motor is used instead of the manual bleed adjuster. Often, the stepper motor is located on or about the eyelet of the shock assembly and in operation, it will cause a needle to move (e.g., up/down) with respect to the bleed to adjust the working fluid flow rate therethrough. However, stepper motor performance is dependent upon a driver circuit (or control system). Thus, using a stepper motor in place of the manual bleed adjuster will incur increased manufacturing costs beyond merely the cost of the stepper motor (due to the control system and mounting needs) and also increase the dead length (and therefore the packaging space requirements) of the shock assembly.

Another electronic control system solution utilizes a solenoid valve is used instead of the manual bleed adjuster. Often, the solenoid valve is located on or about the main piston and is fluidly coupled with the bleed. While a solenoid valve does not necessarily require additional control circuitry, its addition to the main piston will increase the dead length (and therefore the packaging space requirements) of the shock assembly. Of course, the increase in dead length will deleteriously limit the amount of applications within which the shock assembly is able to fit.

Thus, what is needed is an electronic control system that is able to act as a bleed adjust without adding dead length to the shock assembly.

BRIEF DESCRIPTION OF THE DRAWINGS

Aspects of the present invention are illustrated by way of example, and not by way of limitation, in the accompanying drawings, wherein.

DETAILED DESCRIPTION OF THE EMBODIMENTS

The detailed description set forth below in connection with the appended drawings is intended as a description of various embodiments of the present invention and is not intended to represent the only embodiments in which the present invention is to be practiced. Each embodiment described in this disclosure is provided as an example or illustration of the present invention, and should not necessarily be construed as preferred or advantageous over other embodiments. In some instances, well known methods, procedures, and objects have not been described in detail as not to unnecessarily obscure aspects of the present disclosure.

In general, a suspension system for a vehicle provides a motion modifiable connection between a portion of the vehicle that is in contact with a surface (e.g., an unsprung portion) and some or all of the rest of the vehicle that is not in contact with the surface (e.g., a suspended portion). For example, the unsprung portion of the vehicle that is in contact with the surface can include one or more wheel(s), skis, tracks, hulls, etc., while some or all of the rest of the vehicle that is not in contact with the surface include suspended portions such as a frame, a seat, handlebars, engines, cranks, etc.

Often, the suspension system will include one or more shock assemblies which are used to reduce feedback from the unsprung portion of the vehicle before that feedback is transferred to the suspended portion of the vehicle, as the vehicle traverses an environment. However, the language used by those of ordinary skill in the art to identify a shock assembly used by the suspension system can differ while referring to the same (or similar) types of components. For example, some of those of ordinary skill in the art will refer to the shock assembly as a shock absorber, while others of ordinary skill in the art will refer to the shock assembly as a damper (or damper assembly), or the like.

The term "dead length" refers to a given length of the shock assembly that does not contribute to available shock assembly travel. In other words, the dead length of a shock assembly would be a measurement of the shock assembly's overall length while in its most compressed state. For example, a shock assembly has a dead length of 10 inches. This would mean that it cannot fit into any space that is less than 10 inches in length.

The term "travel" refers to the length of the operational portion of the shock, e.g., from its most compressed stated to its most extended state. For example, the shock assembly will have a travel of 3 inches.

The term "maximum working length" refers to the overall length of the shock assembly at its maximum extended state. In other words, the combination of the dead length and the travel. Therefore, in the continuing example, the shock assembly with a dead length of 10 inches and a travel of 3 inches will have a maximum working length of 13 inches. Thus, the exemplary shock would fit within a suspension with more than 10 and no more than 13 inches of available packaging space.

Embodiments disclosed herein provide a powered bleed adjust assembly that utilizes a motor such as a micro type DC motor (approximately ¼ inch in diameter) to provide electronic rebound and/or compression bleed adjust capabilities. In one embodiment, the motor is current limited so it will rotate until it hits an end stop in each direction. Another embodiment uses the motor to turn a lead screw and drive a needle up/down with respect to the bleed to adjust the working fluid flow rate therethrough. In another embodiment, the powered bleed adjust assembly utilizes uses a motor such as, but not limited to, a servo, stepper, piezo, and the like.

The motor is coupled with the barrel valve such that the rotation of the motor shaft will rotate the barrel valve. When the barrel valve is rotated to an open position, the through holes in the barrel valve will align with the ports in the rebound shaft to open the bleed. In contrast, when the barrel valve is rotated to the closed position, the through holes in the barrel valve will no longer be aligned with the ports in the rebound shaft effectively closing the bleed. When the barrel valve is rotated to a position somewhere between the opened and closed positions, the through holes in the barrel valve will partially align with the ports in the rebound shaft to partially open (or partially close) the bleed.

In one embodiment, the components of the powered bleed adjust assembly are all located in a chamber that runs axially within a hollow shaft of the shock assembly. By including the components of the powered bleed adjust assembly within the hollow shaft, no dead length is added to shock assembly.

In addition, any shock assembly with a mechanical rebound adjuster that utilizes a hollow shaft can be converted to an electronically tunable configuration by removing any unnecessary components of the mechanical rebound adjuster from within the shaft and installing the powered bleed adjust assembly in their place. As such, the converted electronically tunable shock assembly will not incur any increase in the packaging space.

Moreover, as long as the motor is used as a modal adjust (e.g., it is current limited and does not require a controller), the converted electronically tunable shock assembly will not incur any additional controller costs.

However, if a more advanced feedback system/controller was desired. Although it would incur additional cost, the controller would not need to be added to the shock assembly such that it increased the dead space (or the packing space) of the shock assembly. For example, in one embodiment the controller could fit within the hollow shaft along with the other components of the powered bleed adjust assembly. In another embodiment, the controller could be located on the shock assembly (such as in an external housing) and be communicatively coupled with the motor via the wiring. In another embodiment, the controller could be located remote from the shock assembly and be communicatively coupled with the motor via the wiring.

Figure 1:
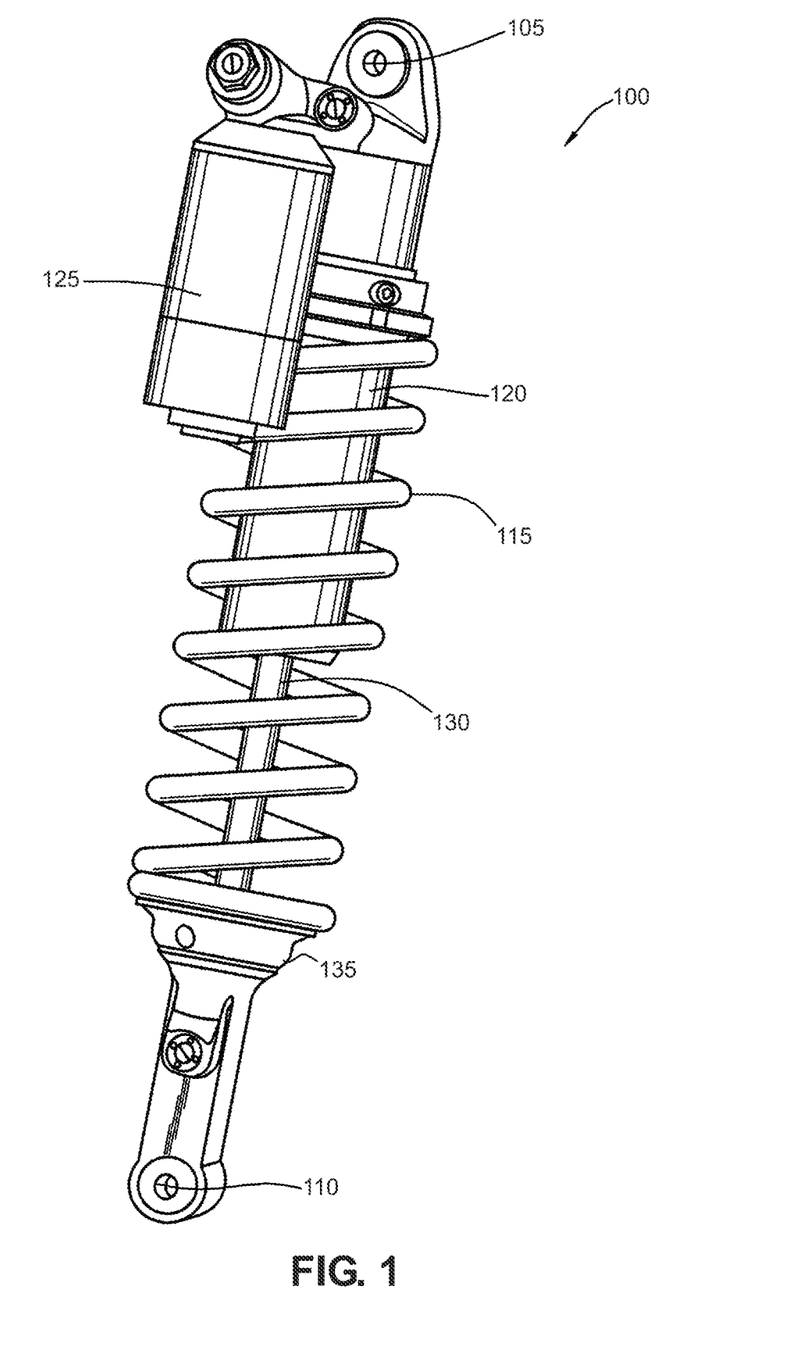
FIG. 1 is a perspective view of a shock assembly with a powered bleed adjust assembly, in accordance with an embodiment.

With reference now to FIG. 1, a perspective view of a shock assembly 100 with a powered bleed adjust assembly 300 (of FIGS. 2 and 3) is shown in accordance with one embodiment. In one embodiment, shock assembly 100 includes a helical spring 115, a damper housing 120, a shaft 130 having a piston coupled therewith and located within a chamber of the damper housing 120, an upper eyelet 105, a lower eyelet 110, and end cap 135, and an external reservoir 125.

In one embodiment, shaft 130 is coupled with end cap 135. In one embodiment, end cap 135 includes a spring seat and lower eyelet 110.

The upper eyelet 105 and lower eyelet 110 are used for mounting one end of the shock assembly to a static portion of a system and the other end of the shock assembly to a dynamic portion of the system. Although eyelets are shown, it should be appreciated that the mounting systems may be bolts, welds, or the like, the use of eyelets is provided as one embodiment and for purposes of clarity.

Although the eyelets are labeled as upper eyelet 105 and lower eyelet 110, this is providing as one embodiment, and for purposes of defining a relative direction of motion of one or more of the components of shock assembly 100. It should be appreciated that in one embodiment, (such as an inverted scenario) the mounting of shock assembly 100 could be with the upper eyelet 105 being at a lower point (such as closer to a wheel retaining assembly) while the lower eyelet 110 would actually be at a higher point on a vehicle than upper eyelet 105 (e.g., such as at the frame of the vehicle).

In one embodiment, external reservoir 125 includes an internal floating piston (IFP) fluidly dividing the external reservoir into a working fluid side and a pressurized gas side. Where the pressurized gas side is able to compress to compensate for the shaft displaced fluid that enters the reservoir. In general, shaft displaced fluid refers to the fluid that is displaced from the damper chamber due to a reduction in available fluid volume within the damper chamber due to the additional volume of shaft 130 as it moves into the damper housing 120 during a compression stroke. Fluid communication between the main chamber of the damper and the external reservoir 125 may be via a flow channel including an adjustable needle valve. Additional detail and description of an external reservoir is described in U.S. Pat. No. 7,374,028 which is entirely incorporated herein by reference.

In one embodiment, there is no external reservoir 125 and instead a base valve and IFP are located within the damper housing to separate the working fluid portion from the pressurized gas portion, wherein the base valve is used to compensate for the reduction in available volume of the damper housing 120 of the shock assembly 100 due to the shaft displaced volume.

Although shock assembly 100 is a coil sprung shock assembly, this is provided as one embodiment and for purposes of clarity. In another embodiment, the shock assembly 100 could be a different type such as, but not limited to, an air sprung fluid damper assembly, a stand-alone fluid damper assembly, and the like. It should also be appreciated that the powered bleed adjust discussed herein could be used in an assortment of apparatus and vehicles such as, but not limited to, a bicycle, motorcycle, ATV, jet ski, car, snow mobile, side-by-side, door, hatch, hood, tailgate, exoskeleton, seat frame, prosthetic, orthotic, and the like.

Figure 2:
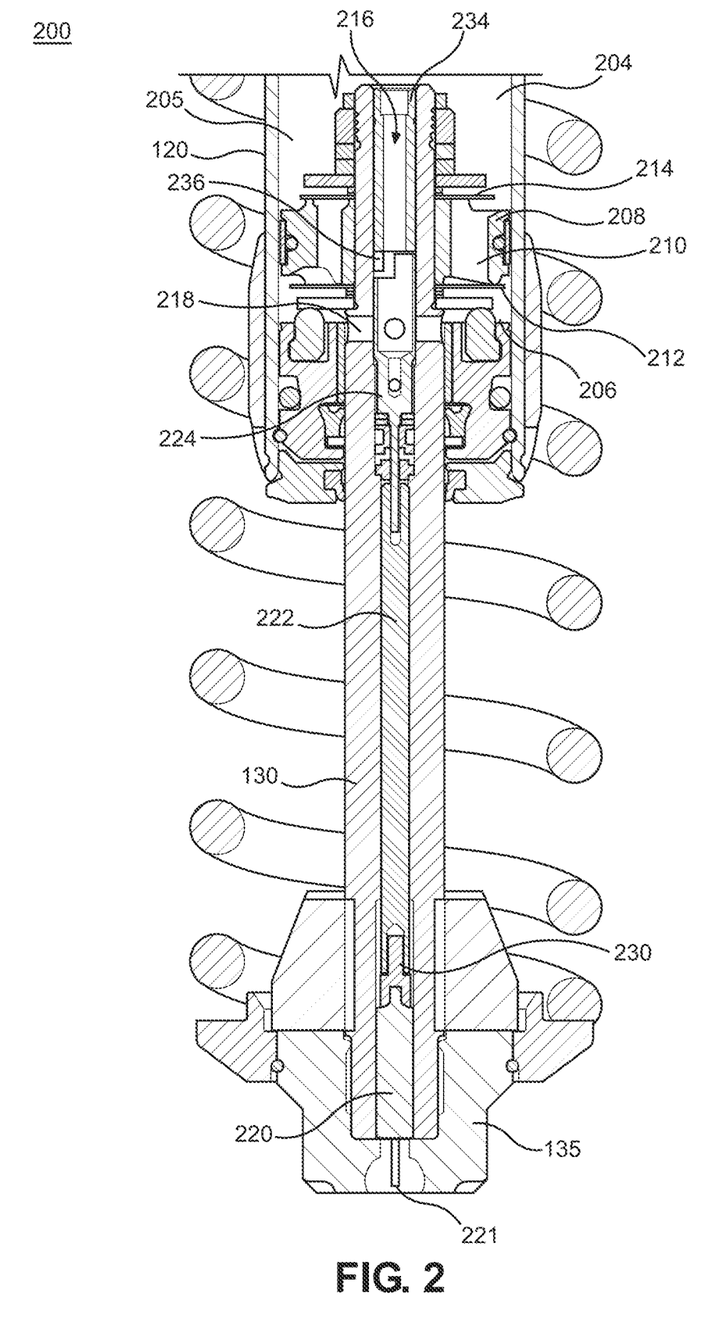
FIG. 2 is a cross sectional view of the shock assembly with powered bleed adjust assembly, in accordance with an embodiment.

Referring now to FIG. 2, a cross sectional view of the shock assembly 100 with powered bleed adjust assembly 300 is shown in accordance with an embodiment. In one embodiment, shock assembly 100 includes damper housing 120, a damping piston 208 coupled with shaft 130, and powered bleed adjust assembly 300 (shown in further detail in FIG. 3). Damper housing 120 includes a main chamber 205 within which damping piston 208 is located. Damping piston 208 operationally divides main chamber 205 into a compression side 204 and a rebound side 206.

In operation, the damping piston 208 and shaft 130 are axially movable within the main chamber 205 of damper housing 120 toward or away from upper eyelet 105 (of FIG. 1). For example, during a compression stroke the damping piston 208 and shaft 130 move axially through the main chamber 205 toward upper eyelet 105. In contrast, during a rebound stroke, the damping piston 208 and shaft 130 move axially through the main chamber 205 away from upper eyelet 105.

In one embodiment, main chamber 205 will include one or more fluid bypasses that allow fluid within the main chamber 205 to flow around damping piston 208 to move between the compression side 204 and the rebound side 206 of the main chamber 205 during at least a portion of the compression and/or rebound stroke. Additional information regarding the configuration and operation of a bypass is described in U.S. Pat. No. 8,857,580 which is entirely incorporated herein by reference.

In one embodiment, damping piston 208 is equipped with fluid paths therethrough (e.g., one or more ports 210) to permit damping fluid within the main chamber 205 to pass therethrough during the compression and/or rebound movement of shock assembly 100. In one embodiment, the ports 210 have shim stacks (or the like) to regulate fluid flow therethrough. In one embodiment, a compression shim stack 212 is used to meter the fluid flow through one or more of the ports 210 during a compression stroke.

For example, during the compression stroke (e.g., when the shock assembly 100 encounters a compression event and the shaft 130 is driven further into the compression side of the main chamber 205 within damper housing 120) some or all of the force imparted by the compression event is transferred to and/or controlled by one or a combination of the fluid moving through the different valving as it traverses via one or more of the ports 210 from the compression side 204 to the rebound side 206 (and/or to the external reservoir 125) and the compression of the helical spring 115. Thus, during a compression event, the damping characteristics (e.g., firmness, softness, stiffness, etc.) of the shock assembly 100 are controlled by the compression valving and the spring force of the helical spring 115.

In contrast, during a rebound stroke, the rebound shim stack 214 is used to meter fluid flow through one or more of the ports 210. For example, after the compression event passes, the compressed helical spring 115 (which surrounds or is mounted in parallel with the damper housing 120) will impart a spring force that will extend the shock assembly 100 causing the shaft 130 and piston to be pulled back from the compression side of the chamber of the damper housing 120.

In one embodiment, the rebound characteristics (e.g., speed) of the rebound stroke are controlled by the rebound valving (e.g., rebound shim stack 214) which controls the rate of the fluid flow through one or more of the ports 210 through damping piston 208 as the fluid moves from the rebound side 206 to the compression side 204 of the main chamber 205. In one embodiment, the rebound characteristics of the rebound stroke are also controlled by the rebound valving that controls the rate of the fluid flow from the external reservoir 125 back to the main chamber 205 of the damper housing 120 (e.g., to replace the reduced shaft volume withdrawn from the chamber of the damper housing 120).

In one embodiment, powered bleed adjust assembly 300 (described in further detail with respect to FIG. 3) includes a central port 216, cross ports 218, motor 220, control wires 232, metering rod 222, barrel valve 224, end cap 135, motor coupler 230, jet 234, and end stop 236. In one embodiment, motor 220 is a DC motor. In one embodiment, motor 220 is a piezo motor, servo motor, stepper motor, or the like.

In one embodiment, the central port 216 is formed within shaft 130 and traverses the entire length thereof. In one embodiment, central port 216 has a fluid opening at a portion of shaft 130 that is above damping piston 208 (e.g., on the compression side 204 of the main chamber 205 as divided by the damping piston 208). In one embodiment, the fluid opening of the central port is located at the distal end of shaft 130.

In one embodiment, the cross ports 218 are formed approximately perpendicular to the central port 216 to provide openings through the wall of shaft 130 and thus openings for the central port 216. The cross ports 218 are located below damping piston 208 (e.g., on the rebound side 206 of the main chamber 205 as divided by the damping piston 208) and work in conjunction with the central port 216 to provide a novel fluid flow path through the damping piston 208 that is not regulated by either the compression shim stack 212 or the rebound shim stack 214.

In one embodiment, jet 234 is located at least partially within the central port 216 between the compression side 204 opening of central port 216 and the cross ports 218. In one embodiment, jet 234 is located completely within the central port 216. Jet 234 is used to modify the diameter of the central port 216 and thereby tune the parameters of the powered bleed adjust assembly 300. In one embodiment, jet 234 has a protrusion that acts as an end stop 236 for the barrel valve 224. In one embodiment, jet 234 includes a check valve to limit fluid flow to a single direction. This check valve may limit fluid flow only during a compression stroke, or only during a rebound stroke.

In one embodiment, motor 220, motor coupler 230, metering rod 222, and barrel valve 224 are all located at least partially within central port 216. In one embodiment, motor 220, motor coupler 230, metering rod 222, and barrel valve 224 are all located completely within central port 216. In one embodiment, one or more of motor 220, motor coupler 230, metering rod 222, and barrel valve 224 are located at least partially within central port 216, while the remainder of the components are all located completely within central port 216.

Barrel valve 224 is located within central port 216 such that the bleed ports of the barrel valve are capable of aligning with the cross ports 218 of shaft 130. In so doing, barrel valve 224 is able to open, partially impede, or block fluid flow through the cross ports 218 (and therefore through central port 216) depending on the rotational position thereof.

In one embodiment, the rotational position of barrel valve 224 is dictated by the motor 220. For example, the rotational output of motor 220 will be passed along the transmission chain resulting in the rotation of barrel valve 224.

Figure 3:
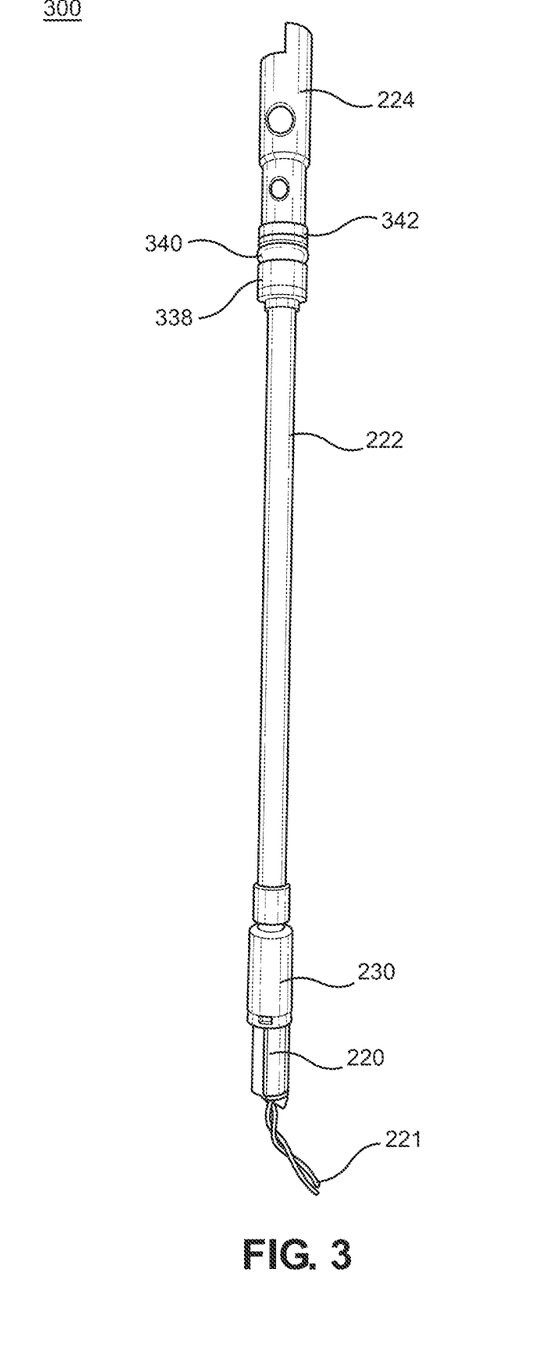
FIG. 3 is a side perspective view of the powered bleed adjust assembly, in accordance with an embodiment.

With reference now to FIG. 3, a side perspective view of the powered bleed adjust assembly 300 is shown in accordance with an embodiment. In the following discussion, the description of the components of FIG. 3 that are similar to those described in FIG. 2 are not repeated for purposes of clarity but are incorporated herein by reference in their entirety.

In one embodiment, the metering rod 222 is located between the barrel valve 224 and the motor coupler 230 and connectively couples the barrel valve 224 with the motor coupler 230. In one embodiment, motor coupler 230 is located between metering rod 222 and motor 220 and connectively couples the metering rod 222 with the motor 220. In one embodiment, motor 220 is located closest to end cap 135 and wires 232 extend from motor 220 out of shaft 130 (as shown in FIG. 2).

In one embodiment, a connection ring 338 is used to couple the metering rod 222 with the barrel valve 224. In one embodiment, an O-rings 340 is used to stop any working fluid from flowing past the connection ring 338 (or the top portion of the metering rod 222) and down toward the motor 220. In one embodiment, a thrust washer 342 is provided between the barrel valve 224 and the connection ring 338 (or the top portion of the metering rod 222).

In one embodiment, motor coupler 230 and motor 220 are a single component. For example, motor coupler 230 may be the shaft of motor 220. In another embodiment, there may be other components located between motor coupler 230 and motor 220.

In one embodiment, metering rod 222 and motor coupler 230 are a single component. In another embodiment, there may be one or more other components located between metering rod 222 and motor coupler 230.

In one embodiment, metering rod 222, motor coupler 230, and motor 220 are a single component. For example, metering rod 222 and motor coupler 230 may be the shaft of motor 220. In another embodiment, there may be one or more other components located between any or all of metering rod 222, motor coupler 230, and motor 220.

In one embodiment, metering rod 222 and barrel valve 224 are a single component. In another embodiment, there may be one or more other components located between metering rod 222 and barrel valve 224.

In one embodiment, barrel valve 224, metering rod 222, and motor coupler 230 are a single component. In another embodiment, there may be one or more other components located between any or all of barrel valve 224, metering rod 222, and motor coupler 230.

In one embodiment, barrel valve 224, metering rod 222, motor coupler 230, and motor 220 are a single component. For example, barrel valve 224, metering rod 222, and motor coupler 230 may be the shaft of motor 220. In another embodiment, there may be one or more other components located between any or all of barrel valve 224, metering rod 222, motor coupler 230, and motor 220.

Figure 4:
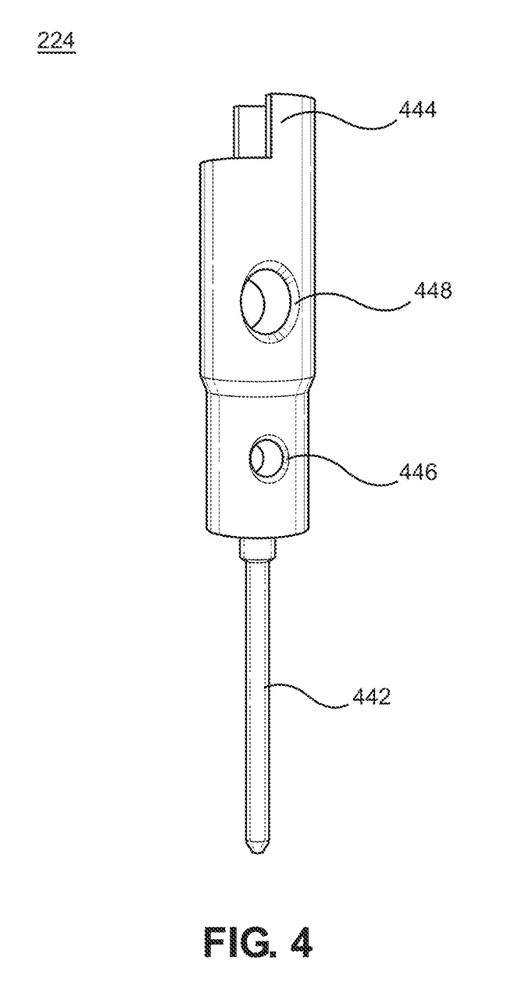
FIG. 4 is a perspective view of the barrel valve, in accordance with an embodiment.

Referring now to FIG. 4, a perspective view of the barrel valve 224 is shown in accordance with an embodiment. In the following discussion, the description of the components of FIG. 4 that are similar to those described in FIG. 2 are not repeated for purposes of clarity but are incorporated herein by reference in their entirety. In one embodiment, barrel valve 224 is a gate valve. In one embodiment, barrel valve 224 is a rotary spool.

In one embodiment, barrel valve 224 includes guide needle 442, bleed ports 448, stopper 444, and pressure balance ports 446.

Figure 5:
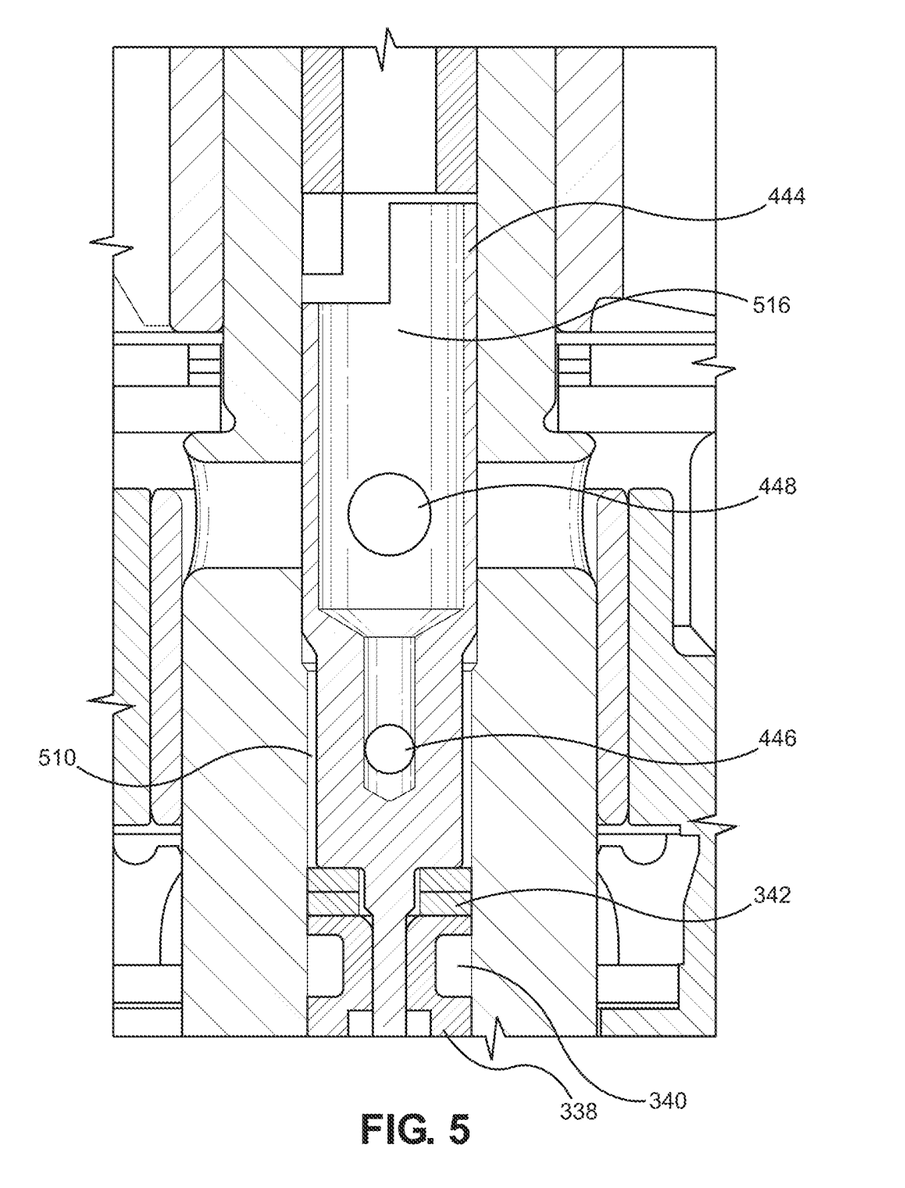
FIG. 5 is a cross section view of the barrel valve of the powered bleed adjust assembly in a closed position, in accordance with an embodiment.

In one embodiment, barrel valve 224 includes an internal fluid path 516 formed within the barrel valve 224 and extending along a longitudinal axis (the axis along the length of the barrel valve 224 body and guide needle 442) of the barrel valve 224 (shown in further detail in FIG. 5). The internal fluid path 516 is open at a top end of the barrel valve 224 (opposite the guide needle 442) to provide an unencumbered flow path from the compression side opening of the central port 216 of shaft 130. Barrel valve 224 also includes a guide needle 442 allowing it to be align and/or coupled with the metering rod 222 (or another component of the powered bleed adjust assembly 300) at a bottom end thereof.

In one embodiment bleed ports 448 are formed approximately perpendicular to the internal fluid path 516 and provide openings through the wall of barrel valve 224 thereby providing a fluid flow path that extends from the top of barrel valve 224 through the bleed ports 448.

Figure 6:
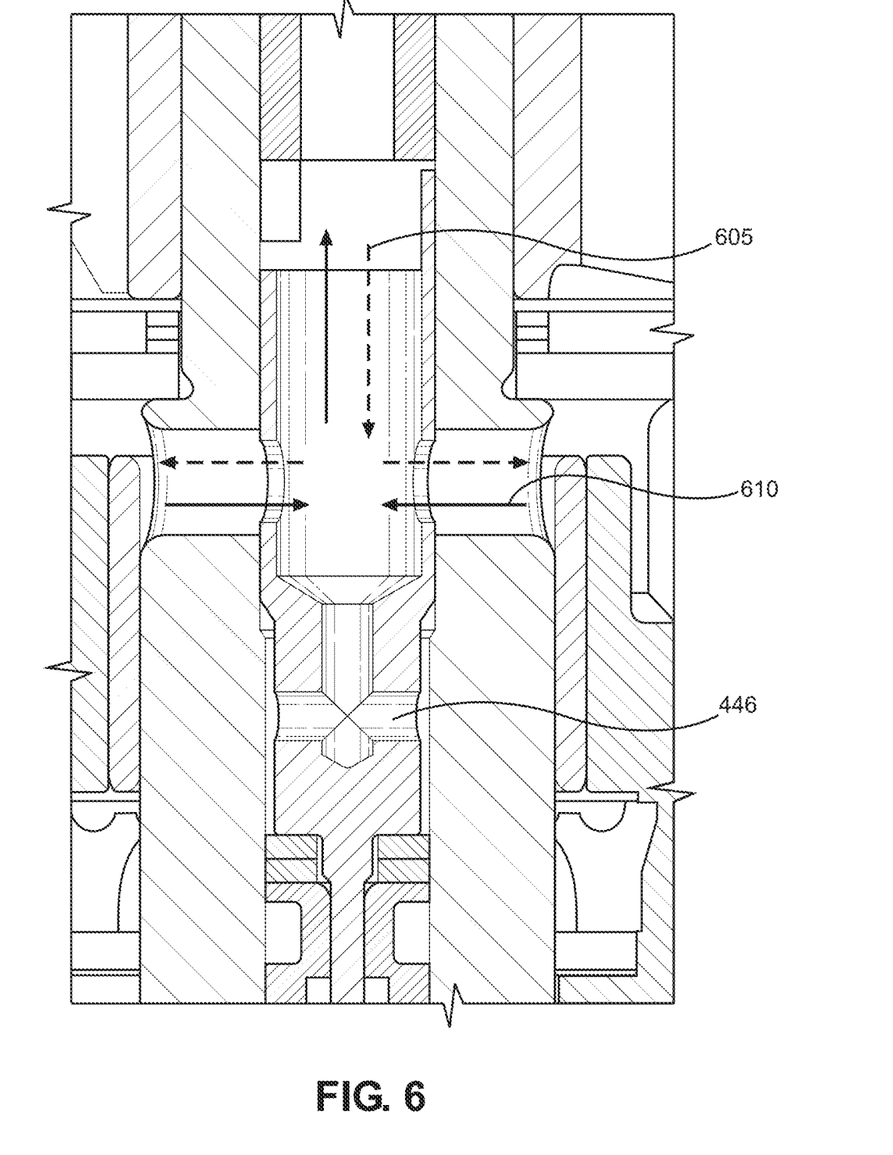
FIG. 6 is a cross section view of the barrel valve of the powered bleed adjust assembly in an open position, in accordance with an embodiment.

When barrel valve 224 is properly installed within the central port 216 of shaft 130, the bleed ports 448 will be on the same plane as the cross ports 218. Thus, when barrel valve 224 is rotated to an open state (as shown in FIG. 6), the bleed ports 448 will be aligned with the cross ports 218 and will allow the working fluid to flow through the bleed. E.g., between the compression side 204 (via jet 234, the internal chamber of barrel valve 224, bleed ports 448, and cross ports 218) and the rebound side 206 via the powered bleed adjust assembly 300.

In contrast, when barrel valve 224 is rotated to a closed state (as shown in FIG. 5), the bleed ports 448 will not be aligned with the cross ports 218 and will reduce and/or stop the ability of the working fluid to flow through the bleed.

In one embodiment, there are a plurality of bleed ports 448. In one embodiment, there are a plurality of bleed ports 448 on different planes. In one embodiment, there are a plurality of bleed ports 448 with one or more varying diameters.

Stopper 444 is used to limit the rotational freedom of barrel valve 224. For example, when barrel valve 224 is rotating, as it reaches its fully open (or fully closed position) stopper 444 will contact the end stop 236 (e.g., a protrusion from jet 234 of FIG. 2) which will stop the directional rotation of barrel valve 224. This stopper 444 will both provide a limit to the rotational range of the barrel valve 224 and also act as an indicator of the actual position of barrel valve 224. In one embodiment, the stopper 444 is larger, smaller, of a different geometric design, slope, angle, or the like, to allow different degrees of rotational freedom for barrel valve 224.

In one embodiment, within the body of barrel valve 224 one or more pressure balance ports 446 are formed approximately perpendicular to the longitudinal axis of barrel valve 224 (e.g., approximately perpendicular to internal fluid path 516) and provide openings through the wall of barrel valve 224 (similar to the bleed ports 448 discussed herein). In one embodiment, pressure balance ports 446 cause barrel valve 224 to be a pressure balanced valve. Further discussion of the pressure balance ports 446 is provided in the description of FIG. 5.

With reference now to FIG. 5, a cross section view of the barrel valve 224 of the powered bleed adjust assembly 300 in a closed position is shown in accordance with an embodiment. In the following discussion, the description of the components of FIG. 5 that are similar to those described in FIGS. 2-4 are not repeated for purposes of clarity but are incorporated herein by reference in their entirety.

In one embodiment, when barrel valve 224 is in a closed position the bleed ports 448 are not aligned with the cross ports 218 thereby reducing and/or stopping the flow of working fluid between the compression side 204 (via jet 234, the internal fluid path 516 of barrel valve 224, bleed ports 448, and cross ports 218) and the rebound side 206 via the powered bleed adjust assembly 300.

However, some amount of working fluid is able to flow through the pressure balance ports 446 and into chamber 510. In so doing, the fluid around the barrel valve 224 will all remain as the same pressure and the barrel valve 224 will remain pressure balanced. Moreover, the thrust washer 342 located between the barrel valve 224 and the connection ring 338 (or the top portion of the metering rod 222) will stop any working fluid from flowing out of the chamber 510 and down into metering rod 222 or further to motor 220. In one embodiment, O-rings 340 will also stop any working fluid from flowing past the connection ring 338 (or the top portion of the metering rod 222) and down toward the motor 220.

With reference now to FIG. 6, a cross section view of the barrel valve 224 of the powered bleed adjust assembly 300 in an open position is shown in accordance with an embodiment. In the following discussion, the description of the components of FIG. 6 that are similar to those described in FIGS. 2-4 are not repeated for purposes of clarity but are incorporated herein by reference in their entirety.

In one embodiment, when barrel valve 224 is in the open position, the bleed ports 448 will be aligned with the cross ports 218. This alignment of ports will allow the working fluid to flow between the compression side 204 (via jet 234, the internal chamber of barrel valve 224, bleed ports 448, and cross ports 218) and the rebound side 206 via the powered bleed adjust assembly 300.

Dashed arrows 605 show the fluid flow direction during a compression stroke while solid arrows 610 show the fluid flow during a rebound stroke.

In one embodiment, as the shock assembly 100 is in a rebound stroke and nearing a fully extended position, cross ports 218 may become at least partially obstructed by the surrounding shock assembly 100 architecture to limit the amount of working fluid that can exit the rebound side 206 via the powered bleed adjust assembly 300. This restriction of fluid flow assists in the shock topping out and damaging itself.

In one embodiment, the powered bleed adjust assembly 300 is utilized in a base valve to reduce bottom out.

Figure 7:
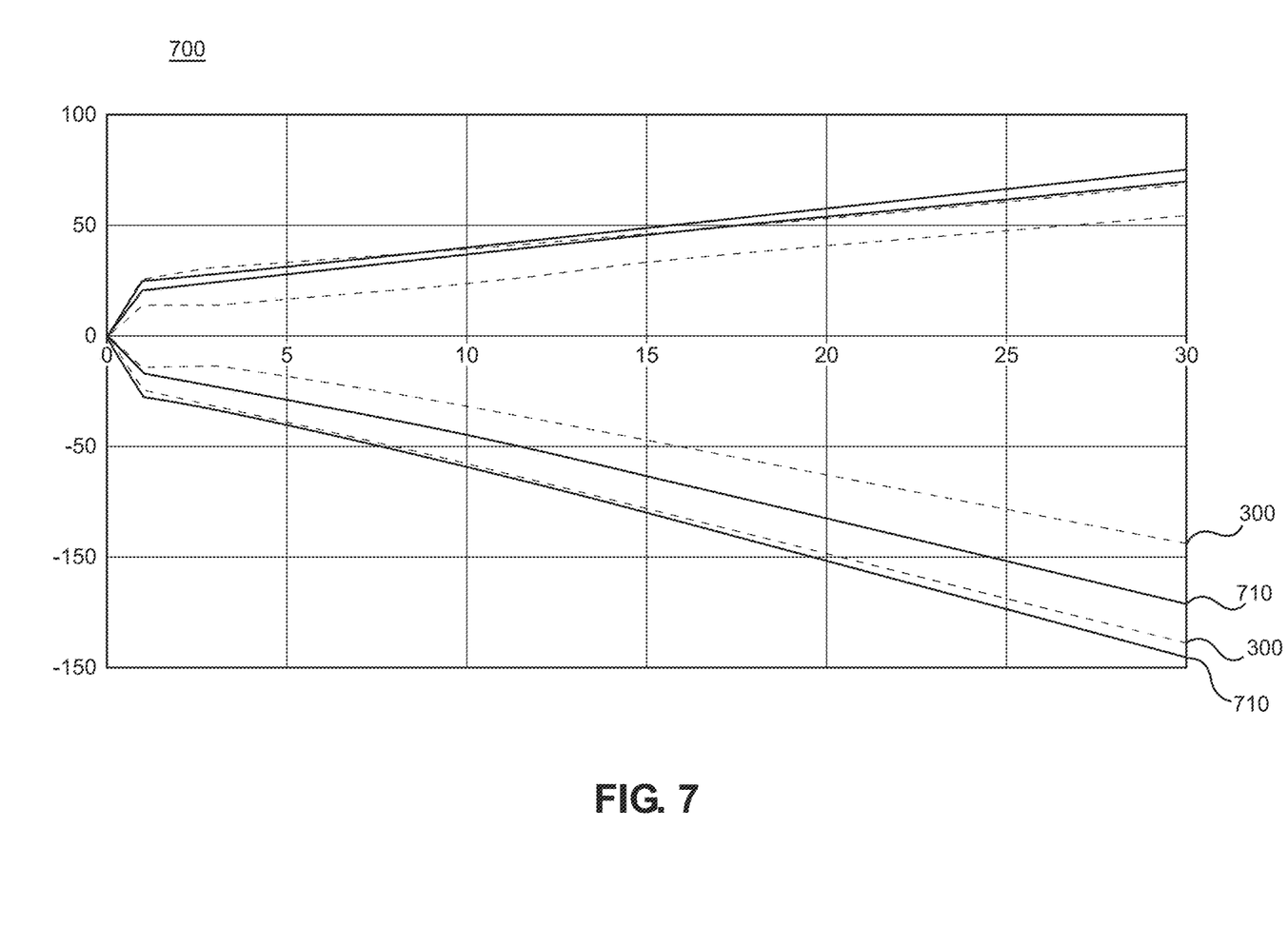
FIG. 7 is a graph of the performance for a shock assembly with the powered bleed adjust assembly versus a shock assembly with a mechanical bleed adjust system, in accordance with an embodiment.

Referring now to FIG. 7, a graph 700 of the performance for a shock assembly with the powered bleed adjust assembly 300 versus a shock assembly with a legacy mechanical bleed adjust system 710 is shown in accordance with an embodiment.

In graph 700, dyno curve testing data is shown over the operation range of each of the powered bleed adjust assembly 300 and the legacy mechanical bleed adjust system 710 in both the open bleed and closed bleed configurations. As shown in graph 700, the powered bleed adjust assembly 300 has approximately twice the range as the legacy mechanical bleed adjust system 710. Further, the operational range of the powered bleed adjust assembly 300 can be further tuned by modifying the size of the jet 234, the diameter of the bleed ports 448, the diameter of the cross ports 218, a combination thereof, and the like.

Motor

In one embodiment, motor 220 is a geared motor 220. In one embodiment, motor 220 is brushless. In one embodiment, motor 220 is a brushed motor. In one embodiment, motor 220 is a non-stepper geared motor 220. In one embodiment, the geared motor is smaller than a stepper motor. In one embodiment the motor 220 is powered by a wireless battery.

In one embodiment, the motor 220 is a micro type DC motor (approximately ¼ inch in diameter). In one embodiment, the micro type DC motor has an axial length that is shorter than an equivalently rated stepper motor.

In one embodiment, the motor 220 is current limited so it will rotate until it hits an end stop in each direction, and does not require a controller to operate. For example, to ensure the complete opening or closing of the barrel valve 224 the motor 220 is turned on for longer than rotationally necessary (for example, if it takes 100 milli seconds to open/close the barrel valve 224 then motor 220 will run for 250 ms). As the barrel valve 224 completes its rotation and hits the end stop 236, the sudden resistance in movement will cause a current spike in the motor 220 as it continues to attempt to rotate the barrel valve 224. When the current spike hits a predefined threshold value, the motor 220 will automatically turn off (e.g., current limited).

In some operational environments, the motor 220 can experience small current spikes from changes in terrain that the vehicle is traversing. For example, when the shock assembly is compressing and/or rebounding while it is traversing terrain, the changing fluid pressure can affect the friction generated during the rotation of the barrel valve 224 which could cause smaller current spikes. Running the motor 220 for longer than rotationally necessary (for the rotational range barrel valve 224) will also prevent the smaller current spikes from stopping the operation of the motor 220 before the barrel valve 224 is fully open or closed.

In one embodiment, instead of a current limited motor 220, a motor controller is used in conjunction with motor 220. In one embodiment, the controller allows power from a power source (such as a battery, capacitor, or the like) to be applied to the motor 220. In one embodiment, full voltage from the power source is supplied such that the motor 220 is spun as quickly as possible. In one embodiment, less than full voltage from the power source is supplied to the motor 220 to modify the speed of rotation of motor 220. In one embodiment, one or more components of the control process (e.g., microcontroller, motor controller, or the like) will also monitor for a condition that occurs during the operation of motor 220 (e.g., current, proxy current, time, resistance, voltage, temperature, other sensors input, or the like) that satisfies a predetermined criteria. When the condition is met, the power to the motor 220 is removed. In one embodiment, there is a delay in cutting off power to motor 220.

In one embodiment, the motor 220 is controlled by a simple switch and relay system that a user or rider can control. In one embodiment, a control system sends commands to the motor 220 via wires 232. In one embodiment, a rider or user provides inputs to the control system to influence how the control system operates the motor 220.

In one embodiment, the rider or user provides the input via a graphical user interface (GUI) and/or human machine interface (HMI) such as an infotainment system HMI/GUI (e.g., in-vehicle infotainment (IVI) system, or the like). In one embodiment, the IVI system may be integrated with the vehicle structure, suspension components, suspension component controller(s) and data processing system as described in U.S. Pat. Nos. 7,484,603; 8,838,335; 8,955,653; 9,303,712; 10,060,499; 10,443,671; 10,737,546; and 10,933,710 the content of each of which are incorporated by reference herein, in their entirety.

In one embodiment, the motor 220 has a torque limiting/limited slip function. This functionality will provide some give/slip when the end stop 236 is hit to reduce motor 220 burnout. In one embodiment, the torque limiting/limited slip functionality can be used in place of the current limited methodology to control the motor 220 operation. For example, instead of waiting for a current spike to remove the power to (and thus stop the operation of) the motor 220, the motor 220 will be powered down when the predefined torque limitation is met.

In one embodiment, the composition of the gear box within the motor 220 is used to change the rotational speed of the barrel valve 224. In one embodiment, the gear box is configured such that the motor 220 can turn at rotational speeds fast enough for the powered bleed adjust assembly 300 to operate as an active or semi active system.

In one embodiment, an energy absorption component is included between (or is used by) one or more of the components of the powered bleed adjust assembly 300. The energy absorption component could be an elastomers and/or a rotationally compliant part (such as a spring, a rotationally flexible material, and the like). The energy absorption component is used to reduce torque, vibration, and the like to reduce and/or prevent degradation and damage of the gear box of the motor 220 due to end stop impacts, frictional changes during the rotational operation of the barrel valve 224, and the like. For example, the utilization of one or more energy absorption components would allow the current increase (e.g., as the barrel valve 224 hits the end stop 236) to be gradual rather than a step function, which would help prevent damage to the motor 220. In one embodiment, elastomers are included in coupling one, some, or all of the components of the powered bleed adjust assembly 300. In one embodiment, metering rod 222 has built in rotational compliance. In one embodiment, one, some, or all of the components of the powered bleed adjust assembly 300 will have built in rotational compliance. This could be due to material choice, or designing a sectional metering rod with springs, or similar structures, or the like.

Intermediate Settings

In one embodiment, the barrel valve 224 can be placed in one or more intermediate settings in addition to the open and closed settings. In one embodiment, the intermediate settings would be the partial alignment of bleed ports 448 with cross ports 218 thereby providing a reduced flow rate via the powered bleed adjust assembly 300. In one embodiment, the intermediate settings would use different sets of bleed ports and/or cross ports on different planes from one another. In one embodiment, the different sets of bleed ports and/or cross ports would be of various diameters to allow for different fluid flow rates.

In one embodiment, a ball-and-spring detent system (or the like) is utilized to monitor the rotational position of the barrel valve 224 with respect to the more or more intermediate settings. For example, a ball-and-spring with a detent is provided either on the barrel valve 224 or on the shaft 130. In addition, one or more cross holes are located on the other of the barrel valve 224 or the shaft 130 and aligned such that during the full range of rotation of the barrel valve 224, the ball-and-spring would encounter each of the one or more cross holes.

As the barrel valve 224 is rotated, each time the ball-and-spring detent system encounters a cross hole it will cause an increase in the rotational friction of the barrel valve 224. This increased friction will result in a torque spike occurring at the motor 220. Since the location of the cross hole(s) are known, and as the torque spike is directory correlated with the increased friction caused by the cross hole encounter, tracking the torque spikes will provide a relatively accurate rotational location/orientation of the barrel valve 224.

For example, if there is a single cross hole located at the halfway point in the barrel valve's rotational range, an identified torque spike would indicate the barrel valve 224 is at the mid-point of its rotational range (e.g., halfway between open and closed).

Similarly, if there are three cross holes, each located ⅓ of the way along the barrel valve's rotational range, a first identified torque spike would indicate the barrel valve 224 being at a first third of its rotational range, a second identified torque spike would indicate the barrel valve 224 being at a second third of its rotational range, and a third identified torque spike would indicate the barrel valve 224 being at a final third of its rotational range. In conjunction with the information about whether the motor 220 was operating in the direction of closing the barrel valve 224 or opening the barrel valve 224, the radial orientation of the barrel valve 224 is established/controlled. Moreover, this methodology could be interpolated and/or extrapolated to provide more or less radial orientation specificity based on the number and/or location of cross holes.

In one embodiment, the ball-and-spring with a detent tracking system will include an indexing aspect (e.g., the barrel valve 224 contacting a stop in the open position and/or the barrel valve 224 contacting a stop in the closed position) to provide a reset to the tracking of the torque spikes.

In operation, the powered bleed adjust assembly 300 could include different barrel valve 224 positions to provide different flow rates through the bleed to provide different damping characteristic adjustments to the shock assembly 100. Thus, a firmer (but not firmest) setting would cause the barrel valve 224 to be opened only a third of the way. Similarly, a softer (but not softest) setting would cause the barrel valve 224 to be opened two-thirds of the way.

In one embodiment, an encoder can be used to track/control the rotational location/orientation of the barrel valve 224 to provide one or more mid-settings.

In one embodiment, motor 220 is coupled with a needle system instead of a metering rod 222 and barrel valve 224.

In one embodiment, the motor 220, barrel valve 224, and connecting components (together referred to as powered bleed adjust assembly 300) fit within the same shaft 130 as one that previously housed a manual rebound adjuster. As such, embodiments are suitable to be used within legacy systems.

For example, any shock assembly with a mechanical rebound adjuster that utilizes a hollow shaft can be converted to an electronically tunable configuration by removing any unnecessary components of the mechanical rebound adjuster from within the shaft and installing the powered bleed adjust assembly 300 in their place. As such, the converted electronically tunable shock assembly will not incur any increase in dead space or packaging space.

Moreover, as long as the motor 220 is used as a modal adjust (e.g., it is current limited and does not require a controller), the converted electronically tunable shock assembly will not incur any additional controller costs.

However, if a more advanced feedback system/controller was desired. Although it would incur additional cost, the controller would not need to be added to the internals of the shock assembly 100 such that it increased the dead space (or the packing space) of the shock assembly 100. For example, in one embodiment the controller could fit within the hollow shaft 130 along with the other components of the powered bleed adjust assembly 300. In another embodiment, the controller could be located on the shock assembly 100 (such as in an external housing) and be communicatively coupled with the motor 220 via wires 232. In another embodiment, the controller could be located remote from the shock assembly 100 and be communicatively coupled with the motor 220 via wires 232.

The foregoing Description of Embodiments is not intended to be exhaustive or to limit the embodiments to the precise form described. Instead, the examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the Claims and their equivalents.

What is claimed is:

1. A powered bleed adjust comprising:
   a barrel valve located at least partially within a bleed fluid pathway of a shaft, said barrel valve comprising:
   an internal fluid path formed along a longitudinal axis of said barrel valve, said internal fluid path extending completely through said barrel valve along said longitudinal axis of said barrel valve, a portion of said internal fluid path centrally formed within said barrel valve and extending axially within said barrel valve, wherein a compression flow of fluid occurs axially about said barrel valve and along said portion of said internal fluid path in a first direction, wherein a rebound flow of said fluid occurs axially about said barrel valve and along said portion of said internal fluid path in a second direction, wherein said compression flow of said fluid and said rebound flow of said fluid travel a same fluid path through said barrel valve, and wherein said first direction of said compression flow is opposite said second direction of said rebound flow of said fluid;
   an opening of said internal fluid path at a first end of said barrel valve; and
   at least one bleed port through a wall of said barrel valve to provide a second opening for said internal fluid path; and
   a motor coupled with said barrel valve, said motor configured to rotate said barrel valve to control a fluid flow through said bleed fluid pathway.

2. The powered bleed adjust of claim 1, wherein said at least one bleed port is approximately perpendicular to said internal fluid path.

3. The powered bleed adjust of claim 1, wherein said barrel valve is oriented with respect to a cross port of said bleed fluid pathway, such that a rotational position of said barrel valve will cause said at least one bleed port to not impede, partially impede, or block a fluid flow through said cross port.

4. The powered bleed adjust of claim 1, wherein said motor is selected from a group consisting of: a current limited motor and a torque limited motor.

5. The powered bleed adjust of claim 1, wherein said barrel valve further comprises:
   a pressure balanced port through a wall of said barrel valve for said internal fluid path, said pressure balanced port providing a fluid pathway to a fluid chamber within a portion of said bleed fluid pathway to pressure balance said barrel valve.

6. The powered bleed adjust of claim 1, further comprising:
   a metering rod coupled between said motor and said barrel valve.

7. The powered bleed adjust of claim 6, further comprising:
   a motor coupler coupled between an output shaft of said motor and said metering rod.

8. The powered bleed adjust of claim 6, further comprising:
   a connection ring configured to couple said metering rod with said barrel valve.

9. A powered bleed adjust for a shock assembly comprising:
   a shaft coupled with and extending through a piston, said shaft comprising:
   a central port along a longitudinal axis of said shaft;
   an opening to said central port of said shaft on a first side of said piston; and
   a cross port through a wall of said shaft on an opposite side of said piston from said opening, wherein said opening, said central port, and said cross port form a bleed fluid pathway;
   a barrel valve located at least partially within said bleed fluid pathway, said barrel valve comprising:
   an internal fluid path formed along a longitudinal axis of said barrel valve, said internal fluid path extending completely through said barrel valve along said longitudinal axis of said barrel valve, a portion of said internal fluid path centrally formed within said barrel valve and extending axially within said barrel valve, wherein a compression flow of fluid occurs axially about said barrel valve and along said portion of said internal fluid path in a first direction, wherein a rebound flow of said fluid occurs axially about said barrel valve and along said portion of said internal fluid path in a second direction, wherein said compression flow of said fluid and said rebound flow of said fluid travel a same fluid path through said barrel valve, and wherein said first direction of said compression flow is opposite said second direction of said rebound flow of said fluid;
   an opening of said internal fluid path at a first end of said barrel valve; and
   at least one bleed port through a wall of said barrel valve to provide a second opening for said internal fluid path; and
   a motor coupled with said barrel valve, said motor configured to rotate said barrel valve to control a fluid flow through said bleed fluid pathway.

10. The powered bleed adjust for said shock assembly of claim 9, wherein said barrel valve is oriented with respect to said cross port of said bleed fluid pathway, such that a rotational position of said barrel valve will cause said bleed port to not impede, partially impede, or block a fluid flow through said cross port.

11. The powered bleed adjust for said shock assembly of claim 9, wherein said motor is selected from a group consisting of: a current limited motor and a torque limited motor.

12. The powered bleed adjust for said shock assembly of claim 9, wherein said barrel valve further comprises:
   a pressure balanced port through a wall of said barrel valve for said internal fluid path, said pressure balanced port providing a fluid pathway to a fluid chamber within a portion of said bleed fluid pathway to pressure balance said barrel valve.

13. The powered bleed adjust for said shock assembly of claim 9, further comprising:
a metering rod coupled between said motor and said barrel valve.

14. The powered bleed adjust for said shock assembly of claim 13, further comprising:
a motor coupler coupled between an output shaft of said motor and said metering rod.

15. The powered bleed adjust for said shock assembly of claim 13, further comprising:
a connection ring configured to couple said metering rod with said barrel valve.

16. A powered bleed adjust that does not affect a dead space of a shock assembly, said powered bleed adjust comprising:
a shaft coupled with and extending through a piston, said shaft comprising:
a central port along a longitudinal axis of said shaft;
an opening to said central port of said shaft on a first side of said piston; and
a cross port through a wall of said shaft on an opposite side of said piston from said opening, wherein said opening, said central port, and said cross port form a bleed fluid pathway;
a barrel valve located within said central port and at least partially within said bleed fluid pathway, said barrel valve comprising:
an internal fluid path formed along a longitudinal axis of said barrel valve, said internal fluid path extending completely through said barrel valve along said longitudinal axis of said barrel valve, a portion of said internal fluid path centrally formed within said barrel valve and extending axially within said barrel valve, wherein a compression flow of fluid occurs axially about said barrel valve and along said portion of said internal fluid path in a first direction, wherein a rebound flow of said fluid occurs axially about said barrel valve and along said portion of said internal fluid path in a second direction, wherein said compression flow of said fluid and said rebound flow of said fluid travel a same fluid path through said barrel valve, and wherein said first direction of said compression flow is opposite said second direction of said rebound flow of said fluid;
an opening of said internal fluid path at a first end of said barrel valve; and
at least one bleed port through a wall of said barrel valve to provide a second opening for said internal fluid path; and
a motor located within said central port and coupled with said barrel valve, said motor configured to rotate said barrel valve to control a fluid flow through said bleed fluid pathway.

* * * * *